United States Patent
Kim et al.

(10) Patent No.: US 9,530,176 B2
(45) Date of Patent: Dec. 27, 2016

(54) IMAGE PROCESSING APPARATUS AND METHOD FOR PROCESSING IMAGE THEREOF

(71) Applicant: SAMSUNG ELECTRONICS CO., LTD., Suwon-si (KR)

(72) Inventors: Ji-won Kim, Seoul (KR); Young-hun Choi, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 265 days.

(21) Appl. No.: 13/767,927

(22) Filed: Feb. 15, 2013

(65) Prior Publication Data

US 2013/0236126 A1    Sep. 12, 2013

(30) Foreign Application Priority Data

Mar. 8, 2012  (KR) .................. 10-2012-0024056

(51) Int. Cl.
*G06T 1/20* (2006.01)
*G06T 1/60* (2006.01)

(52) U.S. Cl.
CPC .. *G06T 1/60* (2013.01); *G06T 1/20* (2013.01)

(58) Field of Classification Search
CPC .............. G06T 15/005; G06F 15/17381; G06F 3/1454; G09G 5/36; G09G 5/001; G01S 7/52063; H04L 67/36
See application file for complete search history.

(56) References Cited

U.S. PATENT DOCUMENTS

| | | | |
|---|---|---|---|
| 4,698,753 A | 10/1987 | Hubbins et al. | |
| 4,965,717 A | 10/1990 | Cutts, Jr. et al. | |
| 5,761,516 A | 6/1998 | Rostoker et al. | |
| 7,958,341 B1* | 6/2011 | Cismas et al. | 712/225 |
| 2005/0041031 A1* | 2/2005 | Diard | 345/505 |
| 2007/0103590 A1* | 5/2007 | Azar | G06F 3/14 |
| | | | 348/459 |
| 2010/0141665 A1* | 6/2010 | Madruga et al. | 345/505 |
| 2011/0142319 A1* | 6/2011 | Lee et al. | 382/131 |

(Continued)

OTHER PUBLICATIONS

Communications dated Oct. 14, 2014 issued by the European Patent Office in counterpart Application No. 13158272.8.

(Continued)

*Primary Examiner* — Phi Hoang
(74) *Attorney, Agent, or Firm* — Sughrue Mion, PLLC (57) ABSTRACT

An image processing apparatus and image processing method thereof are disclosed. The image processing apparatus includes a first image processor which includes a memory, performs a first signal processing on image data, and stores the first signal processed image data in the memory; a second image processor which directly accesses the memory and receives the stored image data, and performs a second signal processing on the received image data; and an image outputter which outputs the image data on which the second signal processing has been performed. Accordingly, only actual image data area is received, reducing data transmission volume, reducing signal transmission lines, securing CPU resources, and improving timing errors. In addition, it is possible to remove an image transmitter such as an additional low voltage differential signaling (LVDS) block, making the image processing apparatus thinner and smaller.

22 Claims, 4 Drawing Sheets

(56) References Cited

U.S. PATENT DOCUMENTS

2012/0249563 A1* 10/2012 Wyatt et al. .................. 345/522
2013/0063462 A1* 3/2013 Bloomfield et al. .......... 345/582
2013/0067186 A1* 3/2013 Pronovost et al. ........... 711/170

OTHER PUBLICATIONS

Brucek Khailany et al., "A Programmable 512 GOPS Stream Processor for Signal, Image, and Video Processing", ISSCC 2007, Session 15, Multimedia and Parallel Signal Processors, 15.2, Feb. 1, 2007, 3 pgs. total.
Communication dated Oct. 12, 2015 issued by the European Patent Office in counterpart European Patent Application No. 13 158 272.8.
Communication dated May 17, 2016 issued by European Patent Office in counterpart European Application No. 13 158 272.8.

\* cited by examiner

IMAGE PROCESSING APPARATUS AND METHOD FOR PROCESSING IMAGE THEREOF

CROSS-REFERENCE TO RELATED APPLICATION

This application claims priority from Korean Patent Application No. 10-2012-24056, filed in the Korean Intellectual Property Office on Mar. 8, 2012, the disclosure of which is incorporated herein by reference in its entirety.

BACKGROUND

1. Field

Methods and apparatuses consistent with the exemplary embodiments relate to an image processing apparatus and method for processing an image thereof, and more particularly, to an image processing apparatus which performs a plurality of signal processing on image data, and an image processing method thereof 2. Description of the Prior Art In order for a viewer to view an image, an image processing apparatus performs a plurality of signal processing (for example, decoding, scaling, frame rate control, timing control, and conversion into 3D images etc.) on image data. Herein, the plurality of signal processing is performed through each block, and each signal processing block is equipped with an additional image transmission unit for transmitting image data.

Figure 1:
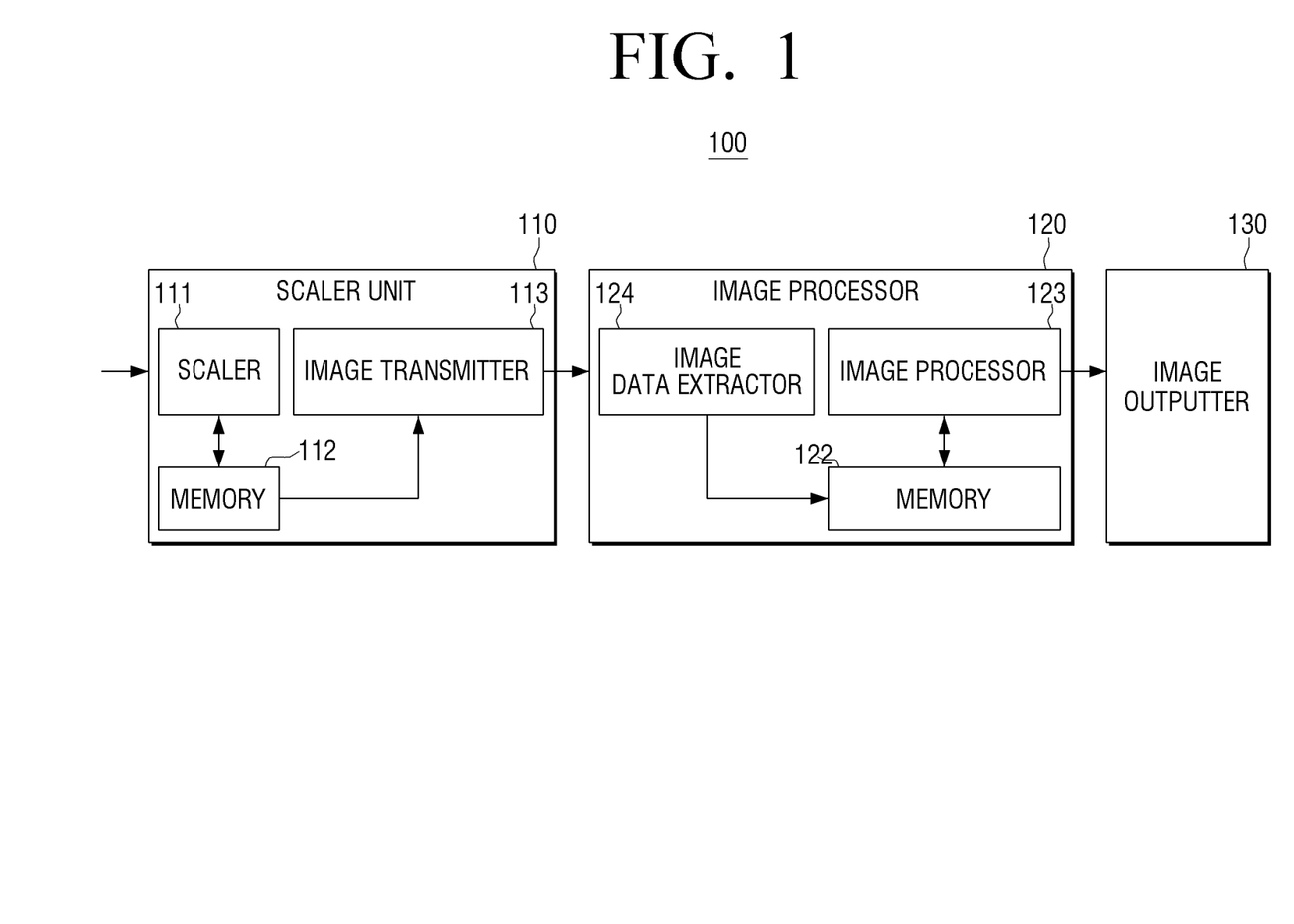
FIGS. 1 and 2 are views for explaining a conventional image processing apparatus.
Figure 2:
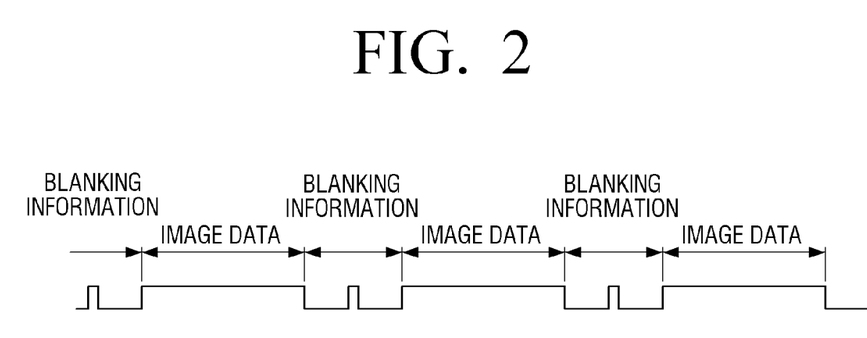

Hereinbelow is an explanation on a conventional image processing apparatus with reference to FIG. 1. The conventional image processing apparatus 100 adjusts an image size of image data received through a scaler 111, and stores the adjusted image data in a memory 112. In addition, the conventional image processing apparatus 100 converts the image data into low voltage differential signaling (LVDS) through an image transmitter 113 as illustrated in FIG. 2, and transmits it to an image processor 120.

In addition, the image processing apparatus 100 extracts image data from LVDS through an image data extractor 121 and stores t he image data in a memory 122, and performs image processing (for example, Frame Rate Control, Timing Control etc.) on the image data stored in the memory 122 through the image processor 123. In addition, the image processing apparatus 100 outputs the signal processed image data through an image outputter 130.

However, in such a conventional image processing apparatus 100, as image data is converted into LVDS and then transmitted through the image transmitter 113, the image processing apparatus is left with increased amount of data to process due to unnecessary information (for example, Blanking information illustrated in FIG. 2) other than actually needed image data.

Furthermore, since the image data needs to be converted into LVDS for image data transmission, problems such as a delay, increase of CPU resources, and timing error may occur during the image processing procedure.

SUMMARY

An aspect of the exemplary embodiments relates to an image processing apparatus which performs a first signal processing on image data and stores the signal processed image data in a memory, by a first image processor, and directly accesses the memory and performs a second signal processing, by a second image processor, and an image processing method thereof.

According to an exemplary embodiment of the present disclosure, an image processing apparatus may include a first image processor which includes a memory, performs a first signal processing on image data, and stores the first signal processed image data in the memory; a second image processor which directly accesses the memory and receives the stored image data, and performs a second signal processing on the received image data; and an image outputter which outputs the image data on which the second signal processing has been performed.

In addition, additional data may be stored together in the memory, and the second image processor may directly access the memory and receive additional data of the image, and perform a second signal processing on the image data with reference to the additional data.

In addition, the second image processor may transmit information on the second image processor to the first image processor, and the first image processor may store the information on the second image processor in a predetermined area.

In addition, the second image processor may directly access the memory and receive specific image data stored in the memory, and perform the second signal processing on the specific image data, during a booting of the image processing apparatus.

In addition, the second image processor may directly access the memory and receive specific image data stored in the memory, and perform the second signal processing on the specific image data, in a case where an operation volume of the first image processor exceeds a value. The value may be a predetermined value.

In addition, the memory may store image data of a GUI (Graphic User Interface), and the second image processor may perform the second signal processing on the image data of the GUI stored in the memory, when a command to generate the GUI is input.

In addition, the image processing apparatus may further include a plurality of image receivers each of which receives a plurality of image data, and the first image processor may perform the first signal processing on each of the plurality of image data received from the plurality of image receivers, and store the plurality of image data on which the first signal has been performed in each of a plurality of areas of the memory.

In addition, the second image processor may change an access area from among the plurality of areas of the memory and change the image data on which the second signal processing is to be performed, when a request to change an image is received. The request to change the image may be received from a user.

In addition, the second image processor may directly access the image data stored in the memory by a PCI-E (Peripheral Component Interconnect Express).

In addition, the first image processor may be a scaler which performs scaling operation of the image data, and the second image processor may include at least one of a frame rate controller which controls a frame rate of the image data, a timing controller which controls an output timing of the image data, and a controller which controls whether or not to output a 3D output of the image data.

Meanwhile, according to another exemplary embodiment of the present disclosure, an image processing method of an image processing apparatus having a first image processor and second image processor may include performing a first signal processing on image data, and storing the first signal processed image data in a memory provided in the first image processor, by the first image processor; directly accessing the memory and performing a second signal processing on the stored image data, by the second image processor; and outputting the image data on which the second signal processing has been performed, by the second image processor.

In addition, additional data of the image data may be stored in the memory, and the second signal processing may directly access the memory and receive the additional data of an image, and perform the second signal processing on the image data with reference to the additional data.

In addition, information on the second image processor may be stored in a predetermined area in the memory.

In addition, the image processing method may further include directly accessing the memory and receiving specific image data stored in the memory, and performing the second signal processing on the specific image data, by the second image processor, when booting the image processing apparatus.

In addition, the image processing method may further include directly accessing the memory and receiving specific image data stored in the memory, and performing the second signal processing on the specific image data, by the second image processor, when an operation volume of the first image processor exceeds a value. The value may be a predetermined value.

In addition, image data of a GUI (Graphic User Interface) may be stored in the memory, and may further include directly accessing the memory and performing the second signal processing on the image data of the GUI stored in the memory, by the second image processor, when a command to generate a GUI is input.

In addition, the image processing method may further include receiving a plurality of image data, and the storing may perform the first signal processing on each of the plurality of image data, and store the plurality of image data on which the first signal processing has been performed in each of the plurality of areas of the memory.

In addition, the image processing method may further include changing an access area from among the plurality of areas of the memory and changing the image data on which the second signal processing is to be processed, when a request to change an image is received. The request to change the image may be received from a user.

In addition, the second image processor may directly access the image data stored in the memory by a PCI-E (Peripheral Component Interconnect Express).

In addition, the first image processor may be a scaler which performs a scaling operation of the image data, and the second image processor may include at least one of a frame rate controller which controls a frame rate of the image data, a timing controller which controls an output timing of the image data, and a controller which controls whether or not to output a 3D output of the image data.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION

Certain exemplary embodiments are described in detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 3:
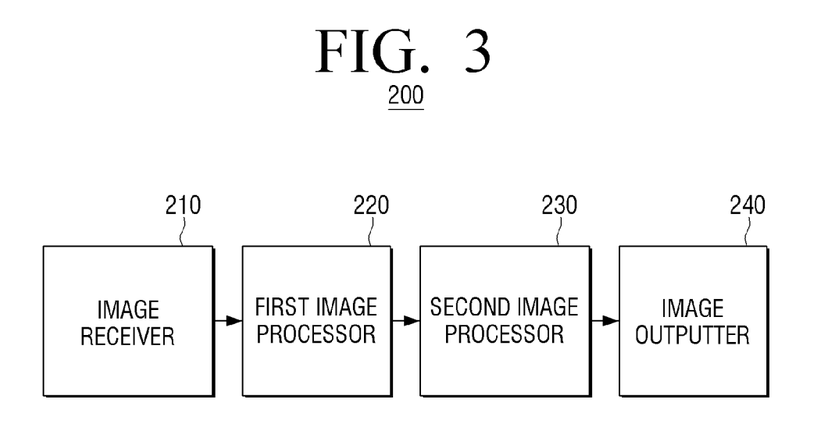
FIG. 3 is a block diagram for briefly illustrating a configuration of an image processing apparatus according to an exemplary embodiment of the present disclosure.

FIG. 3 is a block diagram briefly illustrating a configuration of an image processing apparatus according to an exemplary embodiment of the present disclosure. As illustrated in FIG. 3, an image processing apparatus 200 according to an exemplary embodiment of the present disclosure includes an image receiver 210, first image processor 220, second image processor 230, and image outputter 240. Meanwhile, an image processing apparatus 200 according to an exemplary embodiment of the present disclosure may be embodied in an apparatus which needs signal processing on image data such as a TV, set top box, mobile phone, notebook PC, tablet PC, desktop PC, electronic book, electronic photo frame, and kiosk etc.

The image receiver 210 receives image data from various sources (for example, broadcasting stations and external devices such as DVD players).

The first image processor 220 performs a first signal processing on image data received from the image receiver 210. Herein, a signal processing operation such as decoding and scaling on image data may be included in the first signal processing.

In addition, the first image processor 220 stores the first signal processed image data in a memory provided in the first image processor 220. Herein, not only image data but also additional information on the image data may be stored together in the memory. In addition, information on the second image processor 230 transmitted from the second image processor 230 may also be stored in the memory. Additional information on the image data stored in the memory and information on the second image processor 230 may be used when performing the first signal processing and second signal processing, and may be helpful in performing a more efficient signal processing.

The second image processor 230 directly accesses the memory provided in the first image processor 220 through a DMA (Direct Memory Access) method, receives the stored image data, and performs the second signal processing on the received image data. Herein, the second signal processing may include signal processing on a frame rate of the image data, signal processing on an output timing of the image data, and signal processing on a 3D output of the image data.

Specifically, the second image processor 230 may directly access the image data stored in the memory provided in the first image processor 220 by a PCI-E (Peripheral Component Interconnect Express). However, directly accessing the memory by the second image processor 230 through the PCI-E is merely an exemplary embodiment, and thus the second image processor 230 may directly access the memory using another connecting unit.

In particular, the second image processor 230 may perform a second signal processing on the image data with reference to additional information of the image data stored in the memory.

In addition, the second image processor 230 may directly access the memory and receive certain image data (image data where a manufacturer's logo or phrase is included) stored in the memory and may perform the second signal processing of the certain image data, without processing the image data received from outside.

Furthermore, in a case where an operation amount of the first image processor 220 exceeds a predetermined value and an overload occurs, the second processor 230 may directly access the memory and receive the certain image data (for example, overload guidance message) stored, and perform the second signal processing of the certain image data.

In addition, when a command to generate a GUI (Graphic User Interface) is input, the second processor 230 may directly access the memory and receive image data of the GUI stored in the memory, and perform the second signal processing on the image data of the GUI.

Furthermore, when a plurality of image receivers 210 are provided, the first image processor 220 performs the first signal processing on each of the plurality of image data received from the plurality of image receivers 210, and may store the plurality of image data on which the first signal processing is performed in each of the plurality of areas of the memory. In addition, when a request to change the image is received, the second image processor 230 changes an access area from among the plurality of areas of the memory and performs the second signal processing on the image data requested by the user.

As aforementioned, as the second image processor 230 directly accesses the memory of the first image processor 220 and performs signal processing of the image data, the image processing apparatus 200 may receive only the actual image data area, and reduce data transmission volume, reduce a signal transmission line, secure CPU resources, and improve a timing error. In addition, it is possible to remove an image transmitter such as an additional LVDS block, and thus the image processing apparatus 200 may become thinner and smaller.

Hereinbelow is a further detailed explanation on the image processing apparatus 200 with reference to FIGS. 4 and 5.

Figure 4:
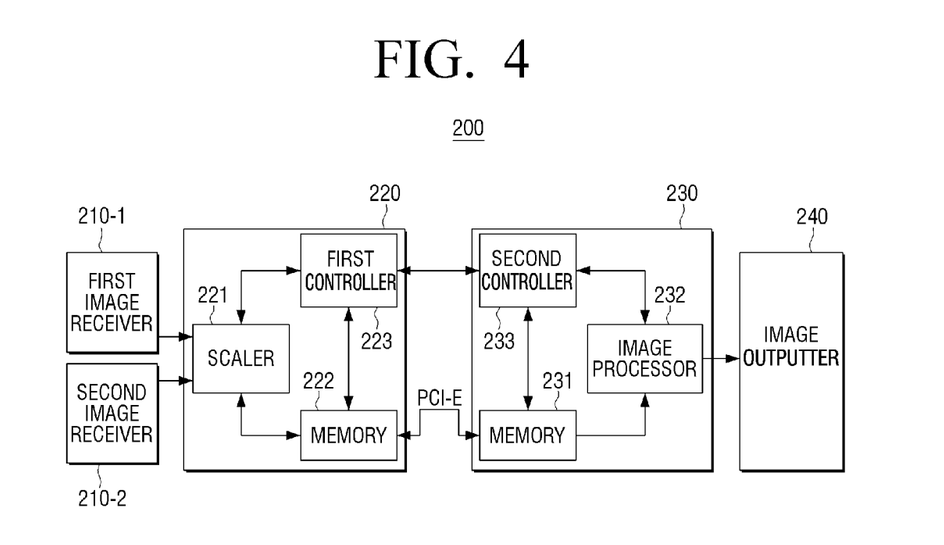
FIGS. 4 and 5 are block diagrams for illustrating in detail a configuration of an image processing apparatus according to various exemplary embodiments of the present disclosure.
Figure 5:
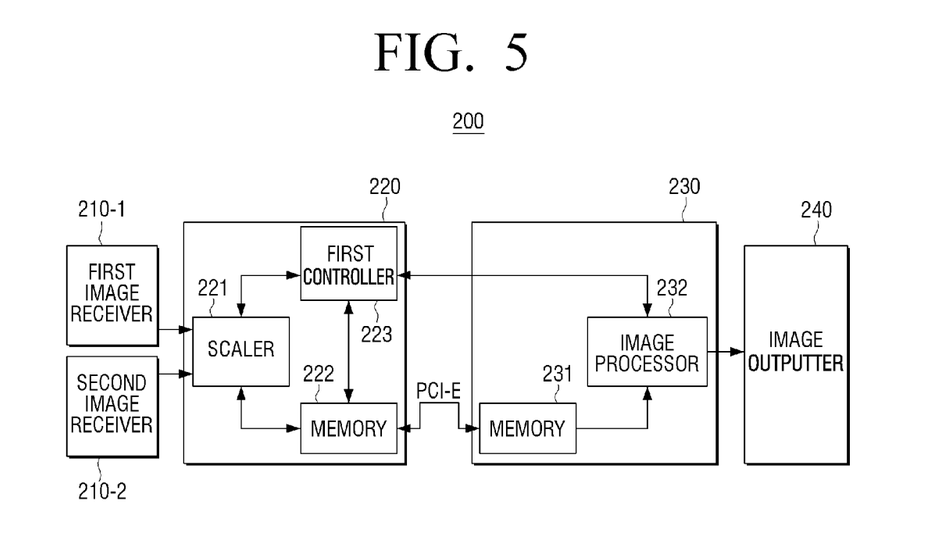

FIG. 4 is a view which illustrates in detail a configuration of the image processing apparatus 200 according to an exemplary embodiment of the present disclosure. As illustrated in FIG. 4, the image processing apparatus 200 includes an image receiver 210, first image processor 220, second image processor 230, and image outputter 240.

The image receiver 210 receives image data from various sources. In particular, the image receiver 210 according to an exemplary embodiment of the present disclosure includes a first image receiver 210-1 and second image receiver 210-2 as illustrated in FIG. 4, and each of the first image receiver 210-1 and second image receiver 210-2 may receive image data from various sources.

More specifically, the first image receiver 210-1 and second image receiver 210-2 receive image data from a web server which transmits image data using a broadcasting station which transmits image data through a broadcasting network or the internet. In addition, it is possible to receive image data from various recording medium reproducing apparatuses either provided within the image processing apparatus 200 or connected to the image processing apparatus 200. A recording medium reproducing apparatus refers to an apparatus which reproduces contents stored in various types of recording media such as a CD, DVD, hard disk, blu-ray disk, memory card, and US memory etc.

In a case of an exemplary embodiment which receives image data from a broadcasting station, the first image receiver 210-1 and second image receiver 210-2 may be embodied into a format which includes configurations such as a tuner (not illustrated), demodulator (not illustrated), and equalizer (not illustrated) etc. Meanwhile, in a case of an exemplary embodiment which receives image data from a source such as a web server, the first image receiver 210-1 and second image receiver 210-2 may be embodied into a network interface card (not illustrated). Otherwise, in a case of an exemplary embodiment which receives image data from the aforementioned various recording medium reproducing apparatuses, the first image receiver 210-1 and second image receiver 210-2 may be embodied into an interface (not illustrated) connected with a recording medium reproducing apparatus. As aforementioned, the first image receiver 210-1 and second image receiver 210-2 may be embodied into various formats according to exemplary embodiments.

In addition, the first image receiver 210-1 and second image receiver 210-2 do not necessary have to receive image data from a same type of source, but rather, the first image receiver 210-1 and second image receiver 210-1 may receive image data from sources of different types from each other. For example, the first image receiver 210-1 may be embodied into a format which includes a tuner, demodulator, and equalizer, while the second image receiver 210-2 may be embodied into a network interface card.

Meanwhile, in FIG. 4, it is explained that there are 2 image receivers 210, but this is merely an exemplary embodiment, and thus the image receiver 210 may also be embodied to be, for example, 3 or more.

The first image processor 220 performs the first signal processing on the image data received from the first image receiver 210-1 and second image receiver 210-2. More specifically, the first image processor 220 includes a scaler 221, memory 22, and first controller 223.

The scaler 221 performs an up or down scaling on the received image data in accordance with a screen size. Herein, the image data input in the scaler 221 may be image data decoded by the decoder (not illustrated). Meanwhile, in FIG. 4, it is explained that there is one scaler 221, but this is merely an exemplary embodiment, and thus a plurality of scalers 221 may be provided.

The memory stores the image data which has been scaling processed. Herein, the memory 222 may store together not only the image data but also additional data of the image data. In addition, the memory 222 may store certain image data which may be displayed when a certain condition (for example, when booting an image processing apparatus) is satisfied, and may also store a GUI.

In addition, the memory may be divided into a plurality of areas, and may store each of the plurality of image data received from the plurality of image receivers 210-1 and 210-2 in the plurality of areas. For example, the memory 222 may include a first area which stores image data received from the first image receiver 210-1 and a second area which stores image data received from the second image receiver 210-2.

The first controller 223 may control the overall operations of the first image processor 210. More specifically, the first controller 223 controls a scaling operation of the image data received from the plurality of image receivers 210-1 and 210-2. In addition, the first controller 223 stores the image data for which the scaling operation has been performed in the memory 222.

The second image processor 230 directly accesses the memory 222 of the first image processor 220 and receives the image data stored in the memory 222, and performs the second signal processing on the received image data. Herein, the second image processor 230 may directly access the memory 222 through the PCI-E and receive the image data, but this is not limited thereto, and thus the second image processor 230 may directly access the memory 222 through another connecting line.

Specifically, the second image processor 230 includes a memory 231, image processor 232 and second controller 233. The memory 231 temporarily stores image data transmitted from the memory 222 by a control of the second controller 233.

The image processor 232 performs the second signal processing on the image data temporarily stored in the memory 231. Herein, the image processor 232 may include at least one of a block which controls a frame rate of the image data, a block which controls an output timing of the image data, and a block which controls a 3D output of the image data. However, this is merely an exemplary embodiment, and thus the image processor 232 may have a block for performing another signal processing.

The second controller 233 controls the overall operations of the second image processor 230. In particular, the second controller 233 controls the memory 231 and image processor 232.

In addition, the second controller 233 may access the additional data of the image data stored in the memory 222 of the first image processor 210 and receive the additional data. In addition, the second controller 233 may control the image processor 232 to perform the second signal processing of the image data with reference to the additional data. For example, in a case where information on the frame rate of the image data is included in the additional data of the data, the second controller 233 may control the image processor 232 to control the frame rate of the image data using the additional data of the image.

Furthermore, when booting the image processing apparatus 200, the second controller 233 may directly access the memory 222 of the first image processor 220 and receive certain image data (for example, booting guidance message) stored in the memory, and perform the second signal processing on the certain image data. For example, when booting the image processing apparatus 200, the second controller 233 may directly access the memory 222 of the first image processor 220 and receive a company logo of a manufacturer stored in the memory, and perform the second signal processing on the company logo. Therefore, when booting the image processing apparatus 200, it is possible to output the certain image data without receiving the image from an outside source, and thus the image processing apparatus 200 becomes able to display the booting guidance message or company logo more quickly.

In addition, in a case where an operation volume of the first image processor 220 exceeds a predetermined value, the second controller 233 may directly access the memory 222 of the first image processor 220 and receive the stored image data (for example, overload message), and perform the second signal processing of the stored image data. Therefore, in a case where an overload occurs in the first image processor 220, the image processing apparatus 200 may control the second controller 233 and guide overload information to the user without any additional operation by the first image processor 220.

In addition, in a case where a GUI (Graphic User Interface) (for example, menu selecting menu, volume adjusting menu etc.) is stored in the memory 222 of the first image processor 220, when a command to generate a GUI is input, the second controller 233 may directly access the memory 222 and receive the GUI stored in the memory 222, and perform the second signal processing on the GUI.

In addition, when the request to change an image is received from the user, the second controller 233 may change the access area from among the plurality of areas of the memory 222 of the first image processor 220 and receive the image data. For example, when the command to change an image is input from the user while the second controller 233 accesses the first area of the memory and receives the first image data stored in the first area, the second controller 233 may change the access area of the memory 222 and receive the second image data stored in the second area of the memory 222. Therefore, in a case where the image that the user wants to view is changed, as the second controller 233 only changes the access area of the memory 222, the image processor 200 becomes able to respond to the users' request to change the image more quickly.

The image outputter 240 outputs the image data signal processed by the second image processor 230. Herein, the image outputter 240 may be embodied in a display panel.

As aforementioned, as the second image processor 230 access the memory 222 of the first image processor 220 directly and receives the image data, the image processing apparatus 200 may receive only the actual image data area and reduce the data transmission volume, reduce the signal transmission line, secure the CPU resources, and improve the timing error. In addition, it is possible to remove the image transmitter such as an additional LVDS block, making the image processing apparatus 200 thinner and smaller.

Meanwhile, in FIG. 4, it has been assumed that a controller which controls the first image processor 220 and second image processor 230 is provided in each of the image processors 220 and 230, but this is merely an exemplary embodiment, and thus a controller provided in either one of the first image processor 220 and second image processor 230 may control each of the image processor 220 and 230. For example, as illustrated in FIG. 5, the first image processor 220 and second image processor 230 may be controlled by the first controller 223 provided in the first image processor 220.

In another exemplary embodiment, the controller which controls image processing may be formed into an additional block outside the first image processor 220 and second image processor 230.

Figure 6:
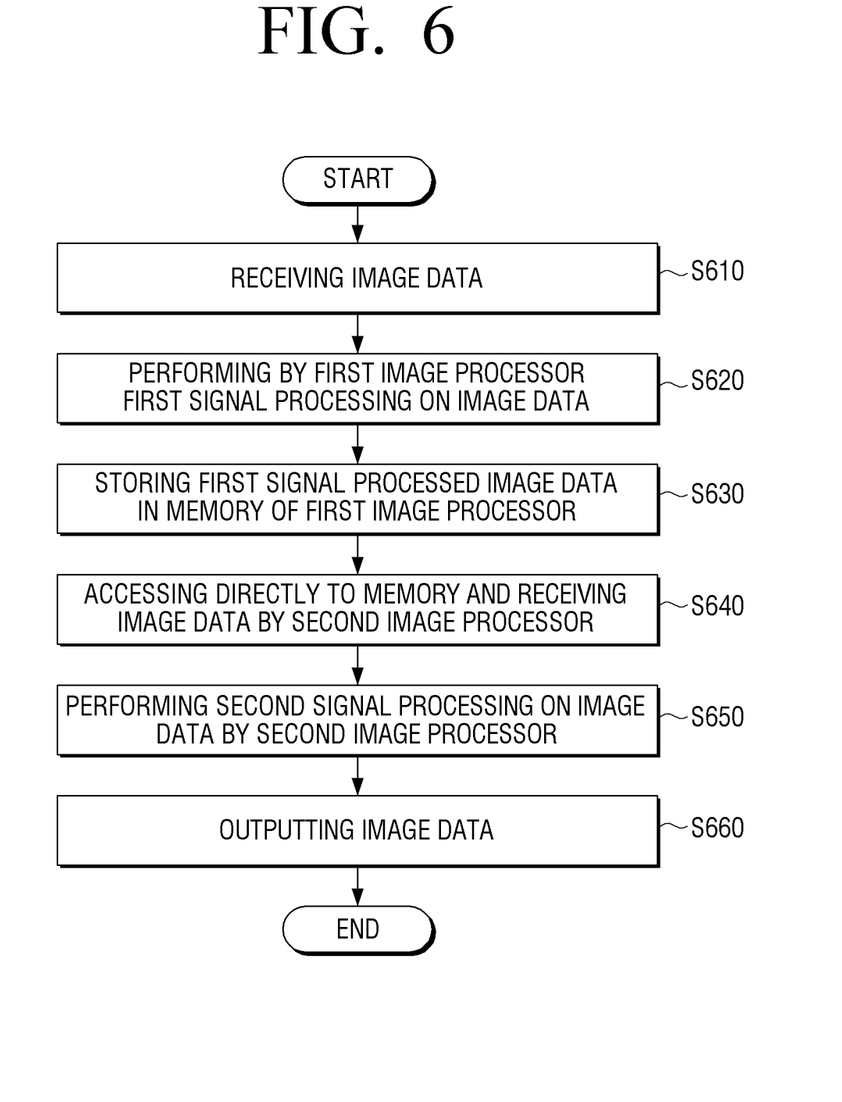
FIG. 6 is a flowchart for illustrating a method for image processing of an image processing apparatus according to an exemplary embodiment of the present disclosure.

Hereinbelow is a further explanation on an image processing method of the present disclosure with reference to FIG. 6.

First, the image receiver 210 receives image data (S610). Herein, the image receiver 210 may receive a plurality of image data from various sources (for example, a broadcasting station, external device, network).

In addition, the first image processor 220 performs the first signal processing of the received image data (S620).

Herein, the first image processor 220 may perform a scaling operation of adjusting a screen size of the received image.

In addition, the first image processor 220 stores the image data which has been first signal processed in the memory 222 of the first image processor 220 (S630). Herein, the first image processor 220 may store not only the image data but also additional information of the image data together in the memory 222.

In addition, the second image processor 230 directly accesses the memory 222 and receives the image data (S640). More specifically, the second image processor 230 may directly access the memory 222 through the PCI-E, and receive the image data stored in the memory 222.

In addition, the second image processor 230 performs the second signal processing of the received image data (S650). Herein, the second image processor 230 may perform at least one signal processing from among a signal processing for controlling the frame rate of the received image data, signal processing for controlling the output timing of the image data, and signal processing for controlling the 3D output of the image data.

In addition, the image outputter 240 outputs the image data which has been first processed and second signal processed (S660).

As aforementioned, as the second image processor 230 directly accesses the memory 222 of the first image processor 220 by the aforementioned image processing method, the image processing apparatus 200 may receive only the actual image data area and reduce the data transmission volume, reduce the signal transmission line, secure the CPU resource, and improve the timing error. In addition, it is possible to remove the image transmitter such as the additional LVDS block, making the image processing apparatus 200 thinner and smaller.

A program for performing the method according to the various aforementioned exemplary embodiments may be stored in various types of recording media.

More specifically, a code for performing the aforementioned methods may be stored in various types of recording media readable in a terminal, such as a RAM (Random Access Memory), flash memory, ROM (Read Only Memory), EPROM (Erasable Programmable ROM), EEPROM (Electronically Erasable and Programmable ROM), register, hard disk, removable disk, memory card, USB memory, CD-ROM etc.

Although a few exemplary embodiments of the present disclosure have been shown and described, it would be appreciated by those skilled in the art that changes may be made in the exemplary embodiments without departing from the principles and spirit of the invention, the scope of which is defined in the claims and their equivalents.

What is claimed is:

1. An image processing apparatus comprising:
   a first image processor which includes a first memory, performs a first signal processing on image data representing a visual image, and stores first signal processed image data in the first memory;
   a second image processor which includes a second memory and performs a second signal processing; and
   an image outputter,
   wherein the second image processor is configured to directly access the first memory, receive the stored image data, and perform the second signal processing on the received image data,
   the image outputter is configured to output the image data on which the second signal processing has been performed,
   wherein the first memory stores image data of a GUI (Graphic User Interface),
   the second image processor performs the second signal processing on the image data of the GUI stored in the first memory, when a command to generate a GUI is input,
   wherein the first image processor performs, based on information on the second signal processing, the first signal processing on the image data before the second image processor performs the second signal processing on the image data,
   wherein the first signal processing comprises at least one of decoding and scaling on the image data, and
   what the second signal processing comprises at least one of signal processing on a frame rate of the image data, signal processing on an output timing of the image data, and signal processing on a 3D output of the image data.

2. The image processing apparatus according to claim 1, wherein additional data is stored in the first memory, and
   the second image processor directly accesses the first memory and receives the additional data of an image, and performs the second signal processing on the first signal processed image data with reference to the additional data.

3. The image processing apparatus according to claim 1, wherein the second image processor transmits information on the second processor to the first image processor, and
   the first image processor stores the information on the second image processing unit in a predetermined area.

4. The image processing apparatus according to claim 1, wherein the second image processor directly accesses the first memory and receives specific image data stored in the first memory, and performs the second signal processing on the specific image data, during a booting of the image processing apparatus.

5. The image processing apparatus according to claim 1, wherein the second image processor directly accesses the first memory and receives specific image data stored in the first memory, and performs the second signal processing on the specific image data, in a case where an operation volume of the first image processor exceeds a value.

6. The image processing apparatus according to claim 5, wherein the value is a predetermined value.

7. The image processing apparatus according to claim 1, further comprising a plurality of image receivers, each of which receives a plurality of image data,
   wherein the first image processor performs the first signal processing on each of the plurality of image data received from the plurality of image receivers, and stores the plurality of image data on which the first signal processing has been performed in each of a plurality of areas of the first memory.

8. The image processing apparatus according to claim 7, wherein the second image processor changes an access area from among the plurality of areas of the first memory and changes the image data on which the second signal processing is to be performed, when a request to change an image is received from a user.

9. The image processing apparatus according to claim 1, wherein the second image processor directly accesses the image data stored in the first memory by a PCI-E (Peripheral Component Interconnect Express) standard.

10. The image processing apparatus according to claim 1, wherein the first image processor is a scaler which performs scaling operation on the image data, and
   the second image processor includes at least one of a frame rate controller which controls a frame rate of the image data, a timing controller which controls an output timing of the image data, and a controller which controls whether or not to output a 3D output of the image data.

11. The image processing apparatus according to claim 1, wherein the second signal processing and the first signal processing are different from each other.

12. An image processing method of an image processing apparatus having a first image processor and a second image processor, the method comprising:
 performing a first signal processing on image data representing a visual image, and storing the first signal processed image data in a first memory provided in the first image processor, by the first image processor;
 directly accessing the first memory to receive the stored image data and performing a second signal processing on the stored first signal processed image data, by the second image processor; and
 outputting the image data on which the second signal processing has been performed, by the second image processor,
 wherein image data of a GUI (Graphic User Interface) is stored in the first memory, and further comprising directly accessing the first memory and performing the second signal processing on the image data of the GUI stored in the first memory, by the second image processor, when a command to generate a GUI is input,
 wherein the first image processor performs, based on information on the second signal processing, the first signal processing on the image data before the second image processor performs the second signal processing on the image data,
 wherein the first signal processing comprises at least one of decoding and scaling on the image data, and
 wherein the second signal processing comprises at least one of signal processing on a frame rate of the image data, signal processing on an output timing of the image data, and signal processing on a 3D output of the image data.

13. The image processing method according to claim 12, wherein additional data of the image data is stored in the first memory, and
 the second signal processing directly accesses the first memory and receives the additional data of an image, and performs the second signal processing on the first signal processed image data with reference to the additional data.

14. The image processing method according to claim 12, wherein information on the second image processor is stored in a predetermined area in the first memory.

15. The image processing method according to claim 12, further comprising directly accessing the first memory and receiving specific image data stored in the first memory, and performing the second signal processing on the specific image data, by the second image processor, when booting the image processing apparatus.

16. The image processing method according to claim 12, further comprising directly accessing the first memory and receiving specific image data stored in the first memory, and performing the second signal processing on the specific image data, by the second image processor, when an operation volume of the first image processor exceeds a value.

17. The image processing method according to claim 16, wherein the value is a predetermined value.

18. The image processing method according to claim 12, further comprising receiving a plurality of image data,
 wherein the first image processor performs the first signal processing on each of the plurality of image data, and stores the plurality of image data on which the first signal processing has been performed in each of a plurality of areas of the first memory.

19. The image processing method according to claim 18, further comprising changing an access area from among the plurality of areas of the first memory and changing the image data on which the second signal processing is to be processed, when a request to change an image is received.

20. The image processing method according to claim 19, wherein the request to change the image is received from a user.

21. The image processing method according to claim 12, wherein the second image processor directly accesses the image data stored in the first memory by a PCI-E (Peripheral Component Interconnect Express) standard.

22. The image processing method according to claim 12, wherein the first image processor is a scaler which performs a scaling operation on the image data, and
 the second image processor includes at least one of a frame rate controller which controls a frame rate of the image data, a timing controller which controls an output timing of the image data, and a controller which controls whether or not to output a 3D output of the image data.

* * * * *